United States Patent
Huang

(10) Patent No.: US 12,254,567 B1
(45) Date of Patent: Mar. 18, 2025

(54) METHOD, DEVICE, TERMINAL AND MEDIUM FOR ADAPTIVELY RENDERING FAN-SHAPED IMAGE TO 3D MODEL

(71) Applicant: Shenzhen Saiwai Technology Co., Ltd., Guangdong (CN)

(72) Inventor: Ming Huang, Guangdong (CN)

(73) Assignee: Shenzhen Saiwai Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/896,969

(22) Filed: Sep. 26, 2024

(30) Foreign Application Priority Data

Nov. 13, 2023 (CN) .......................... 202311505934.6

(51) Int. Cl.
G06T 15/04 (2011.01)
G06T 7/13 (2017.01)
G06T 7/60 (2017.01)
G06T 17/00 (2006.01)

(52) U.S. Cl.
CPC ............... *G06T 17/00* (2013.01); *G06T 7/13* (2017.01); *G06T 7/60* (2013.01); *G06T 15/04* (2013.01)

(58) Field of Classification Search
CPC .................................................... G06T 15/04
See application file for complete search history.

(56) References Cited

U.S. PATENT DOCUMENTS

2015/0187135 A1 7/2015 Magder et al.
2019/0392553 A1* 12/2019 Fox ........................... G06T 3/18

FOREIGN PATENT DOCUMENTS

| CN | 112819939 A | 5/2021 |
|---|---|---|
| CN | 113284211 A | 8/2021 |
| CN | 113689536 A | 11/2021 |
| CN | 113947657 A | 1/2022 |
| CN | 114004925 A | 2/2022 |
| CN | 115187711 A | 10/2022 |

OTHER PUBLICATIONS

1st Office Action of counterpart Chinese Patent Application No. 202311505934.6 issued on May 30, 2024.
Notice of Allowance of counterpart Chinese Patent Application No. 202311505934.6 issued on Jul. 30, 2024.
Li Yao, Local texture mapping based on triangular mesh model, Computer Applications and Software, Mar. 2015, pp. 205-223, vol. 32 No. 3.
Lu-Mei Zuo, Application of Texture Mapping Technology in 3D Game Engine, Count Calculate Machine, Oct. 2004, pp. 146-148, vol. 21 No. 10.

* cited by examiner

*Primary Examiner* — Ryan McCulley

(57) ABSTRACT

Disclosed are a method, device, terminal and medium for adaptively rendering a fan-shaped image to a 3D model. The method includes: importing a 3D model and a fan-shaped image; setting UV coordinates of four vertices of a sampling area; selecting a rendering area of the 3D model, and traversing all triangular facets in the rendering area through an edge traversal method; for each vertex of each triangular facet, locating a corresponding UV mapping point on the fan-shaped image to obtain UV texture coordinate data of the 3D model mapped onto the fan-shaped image; and sending the UV texture coordinate data to the rendering area of the 3D model. The present disclosure reduces the number and size of files, and improves a rendering speed and precision. Same parameters can be used directly for images of a same specification and size as long as an image position offset remains unchanged.

6 Claims, 5 Drawing Sheets

```
┌─────────────────────────────────────────────────────────────────────────┐
│ Determine upper and lower edges of the rendering area of the 3D model   │
│ to calculate a height of the rendering area; locate upper and lower     │── S61
│ intersection points where the upper and lower edges intersect with a    │
│ seam line, where the two intersection points are respectively named as  │
│ an upper starting point of rendering and a lower starting point of      │
│ rendering                                                               │
└─────────────────────────────────────────────────────────────────────────┘
                                    ↓
┌─────────────────────────────────────────────────────────────────────────┐
│ Select any rendering starting point to determine a side length of the   │
│ left_line, i.e., a height of the sampling area; define coordinates S of │── S62
│ a rendering starting point S in a rectangular coordinate system of a    │
│ three-dimensional cone                                                  │
└─────────────────────────────────────────────────────────────────────────┘
                                    ↓
┌─────────────────────────────────────────────────────────────────────────┐
│ Calculate a height scaling ratio k between the rendering area and the   │── S63
│ sampling area                                                           │
└─────────────────────────────────────────────────────────────────────────┘
                                    ↓
┌─────────────────────────────────────────────────────────────────────────┐
│ Create a circular section perpendicular to a central axis of the 3D     │── S64
│ model through the upper starting point S, and intersect the central     │
│ axis at a point O' to obtain a vector O'S                               │
└─────────────────────────────────────────────────────────────────────────┘
                                    ↓
┌─────────────────────────────────────────────────────────────────────────┐
│ Create a circular section perpendicular to the central axis of the 3D   │── S65
│ model through the vertex V, and intersect the central axis at a point   │
│ O" to obtain a vector O"V                                               │
└─────────────────────────────────────────────────────────────────────────┘
                                    ↓
┌─────────────────────────────────────────────────────────────────────────┐
│ Rotate the vector O'S to be parallel to the point O"V to obtain a       │── S66
│ vector O'S', where a point S' is a point on an outer surface of the 3D  │
│ model                                                                   │
└─────────────────────────────────────────────────────────────────────────┘
                                    ↓
┌─────────────────────────────────────────────────────────────────────────┐
│ Based on a cross product of the two spatial vectors, calculate an       │── S67
│ angle θ at which the vector O'S rotates to the vector O'S'              │
└─────────────────────────────────────────────────────────────────────────┘
                                    ↓
┌─────────────────────────────────────────────────────────────────────────┐
│ Based on the calculated angle θ, calculate spatial coordinates          │── S68
│ S' (x', y', z') of the point S', and then calculate a spatial length d  │
│ from the point S' to the vertex V                                       │
└─────────────────────────────────────────────────────────────────────────┘
                                    ↓
┌─────────────────────────────────────────────────────────────────────────┐
│ Based on the height scaling ratio k and the spatial length d, calculate │── S69
│ the UV mapping point V' of the vertex V on the fan-shaped image         │
└─────────────────────────────────────────────────────────────────────────┘
```

FIG. 2

Record a corresponding position of a vertex on the side line segment left_line of the sampling area as a point P1 after shrinking by a length d*k along the side line segment left_line, draw a straight line line1 connecting the point P1 and the center O, and calculate a distance R from the point P1 to the center O — S691

Locate an intersection point P2 where a circle with the center O and a radius R intersects with the side line segment right_line, and draw a straight line line2 connecting the point P2 and the center O — S692

Calculate an angle θ' between the line1 and the line2 — S693

Calculate a rotation angle θ''=(θ'/(2π))*θ according to the angles θ and θ' — S694

Apply a UV coordinate translation and rotation matrix A(θ'') to the point P1 to obtain the UV mapping point V' of the vertex V on the fan-shaped image, where the A(θ'') represents a rotation matrix that rotates the point P1 by the angle θ'' — S695

FIG. 3

METHOD, DEVICE, TERMINAL AND MEDIUM FOR ADAPTIVELY RENDERING FAN-SHAPED IMAGE TO 3D MODEL

CROSS REFERENCE TO RELATED APPLICATIONS

The present application claims the benefit of Chinese Patent Application No. 202311505934.6 filed on Nov. 13, 2023, the contents of which are incorporated herein by reference in their entirety.

TECHNICAL FIELD

The present disclosure relates to the technical field of printing designs, and in particular to a method, device, terminal and medium for adaptively rendering a fan-shaped image to a 3D model.

BACKGROUND

Before production of any cone-shaped product such as a paper cup, content to be printed needs to be designed and typeset through a graphic design. It is necessary to render the graphic design to a 3D model, to visualize a design effect more intuitively, identify potential defects in the design before the paper cup is produced, and reduce the number of proofing times or even achieve zero proofing, so as to reduce costs.

The graphic design of a paper cup must be output as a fan-shaped image before printing, die-cutting and molding. The fan-shaped image is designed to be atypical, and a 3D texture map is always based on a rectangular image to render a surface of the 3D model. Therefore, there exist certain challenges in rendering the fan-shaped image of the paper cup to the 3D model. At present, the following two industry solutions are available:

(1) Atypical processing of the fan-shaped image of the paper cup: That is, the fan-shaped image is converted into a distorted image that approximates a rectangle in shape by means of 3D modeling software or any other tool, then the distorted image is placed at a fixed position of a larger rectangular background image (usually a white background) according to the 3D model used for the paper cups, the entire large rectangular background image serves as a final texture image for the entire surface of the 3D model, and finally texture coordinate (UV coordinates) data is exported to a 3D graphics processing program to produce a printed paper cup in a simulated manner. However, each fan-shaped image needs to be converted into a distorted near-rectangle image, and texture coordinate data of the same model cannot be reused, which severely slows down a rendering speed of the 3D graphics processing program.

(2) Based on the rectangular image rather than the fan-shaped image required for final production: That is, the rectangular image can be appropriately cut to adapt to the model, but this solution only serves a demonstration purpose and may cause effective design content to be deleted, which is obviously unreasonable, or will cause severe deformation when the image is mapped to the 3D model. Therefore, this solution cannot be used to track actual state of any product design and production, and is of no significance for detecting defects.

Moreover, according to either of the two solutions, a 3D model for each model of paper cups requires manual texturing by means of a modeling tool to determine an exact texture position. However, many disadvantages exist, including a huge workload, poor adaptability, and impossibility to directly utilize a wealth of existing industry design resources. According to either of the two solutions, to determine the texture coordinate data, the distorted image obtained after conversion needs to be put in the larger rectangular background image. However, as the final texture image, this background image occupies more memory and storage space, thereby complicating network transmission and causing failure to simulate the actual state of any product in the production process.

In view of this, it is necessary to provide a method, device, terminal and medium for adaptively rendering a fan-shaped image to a 3D model to overcome the above defects.

SUMMARY

An objective of the present disclosure is to provide a method, device, terminal and medium for adaptively rendering a fan-shaped image to a 3D model, so as to overcome the defects of existing methods of mapping fan-shaped images to 3D models in the prior art including a relatively low rendering precision and poor adaptability.

To achieve the above objective, the present disclosure, in a first aspect, provides a method for adaptively rendering a fan-shaped image to a 3D model. The method includes the following steps:

S10: importing a 3D model and a fan-shaped image;

S20: setting UV coordinates of top-left, bottom-left, top-right and bottom-right vertices of a sampling area based on the fan-shaped image;

S30: based on the UV coordinates of the four vertices of the sampling area, fitting two concentric circles corresponding to upper and lower arcs of the fan-shaped image, and obtaining the UV coordinates of a center O of the two concentric circles;

S40: based on the UV coordinates of the four vertices of the sampling area, fitting two left and right side line segments of the fan-shaped image in the sampling area, and denoting them as left_line and right_line respectively;

S50: selecting any triangular facet in a rendering area of the 3D model as a traversal starting triangle, and starting from the traversal starting triangle to traverse all triangular facets in the rendering area through an edge traversal method;

S60: traversing triangular facet in a triangle queue and executing a vertex to UV point mapping algorithm for the 3D model, i.e., for each vertex $V(x_i, y_i, z_i)$ of triangular facet, locating a corresponding UV mapping point $V'(x_i', y_i', z_i')$ on the fan-shaped image, to obtain UV texture coordinate data of the 3D model mapped onto the fan-shaped image; and S70: sending the UV texture coordinate data to the rendering area of the 3D model to obtain an actual rendering effect of the fan-shaped image in the 3D model.

In a preferred embodiment, the S60 includes:

S61: determining upper and lower edges of the rendering area of the 3D model to calculate a height of the rendering area; locating upper and lower intersection points where the upper and lower edges intersect with a seam line, where the two intersection points are respectively named as an upper starting point of rendering and a lower starting point of rendering;

S62: selecting any rendering starting point to determine a side length of the left_line, i.e., a height of the sampling area; defining coordinates S (x0,y0,z0) of a rendering starting point S in a rectangular coordinate system of a three-dimensional cone;

S63: calculating a height scaling ratio k between the rendering area and the sampling area, where k=the height of the sampling area/the height of the rendering area;

S64: creating a circular section perpendicular to a central axis of the 3D model through the upper starting point S, and intersecting the central axis at a point O' to obtain a vector O'S;

S65: creating a circular section perpendicular to the central axis of the 3D model through the vertex V(xi, yi, zi), and intersecting the central axis at a point O" to obtain a vector O"V;

S66: rotating the vector O'S to be parallel to the point O"V to obtain a vector O'S', where a point S' is a point on an outer surface of the 3D model;

S67: based on a cross product of the two spatial vectors, calculating an angle θ at which the vector O'S rotates to the vector O'S';

S68: based on the calculated angle θ, calculating spatial coordinates S' (x', y', z') of the point S', and then calculating a spatial length d from the point S' to the vertex V(xi, yi, zi); and S69: based on the height scaling ratio k and the spatial length d, calculating the UV mapping point V' of the vertex V on the fan-shaped image.

In a preferred embodiment, the S69 includes:

S691: recording a corresponding position of a vertex on the side line segment left_line of the sampling area as a point P1 after shrinking by a length d*k along the side line segment left_line, drawing a straight line line1 connecting the point P1 and the center O, and calculating a distance R from the point P1 to the center O;

S692: locating an intersection point P2 where a circle with the center O and a radius R intersects with the side line segment right_line, and drawing a straight line line2 connecting the point P2 and the center O;

S693: calculating an angle θ' between the line1 and the line2;

S694: calculating a rotation angle θ"=(θ'/(2π))*θ according to the angles θ and θ'; and S695: applying a UV coordinate translation and rotation matrix A (θ") to the point P1 to obtain the UV mapping point V' of the vertex V on the fan-shaped image, where the A (θ") represents a rotation matrix that rotates the point P1 by the angle θ".

In a preferred embodiment, the S50 includes:
filtering all triangular facets in the rendering area.

The present disclosure, in a second aspect, provides a device for adaptively rendering a fan-shaped image to a 3D model. The device includes:

a parameter import module, configured for importing a 3D model and a fan-shaped image;

a coordinate determination module, configured for setting UV coordinates of top-left, bottom-left, top-right and bottom-right vertices of a sampling area based on the fan-shaped image;

a vertex fitting module, configured for fitting two concentric circles corresponding to upper and lower arcs of the fan-shaped image based on the UV coordinates of the four vertices of the sampling area, and obtaining the UV coordinates of a center O of the two concentric circles;

a line fitting module, configured for fitting two left and right side line segments of the fan-shaped image in the sampling area based on the UV coordinates of the four vertices of the sampling area, and denoting them as left_line and right_line respectively;

a triangle traversal module, configured for selecting any triangular facet in a rendering area of the 3D model as a traversal starting triangle, and starting from the traversal starting triangle to traverse all triangular facets in the rendering area through an edge traversal method;

a vertex mapping module, configured for traversing triangular facet in a triangle queue and executing a vertex to UV point mapping algorithm for the 3D model, i.e., for each vertex V(xi,yi,zi) of triangular facet, locating a corresponding UV mapping point V'(xi',yi',zi') on the fan-shaped image, to obtain UV texture coordinate data of the 3D model mapped onto the fan-shaped image; and a coordinate conversion module, configured for sending the UV texture coordinate data to the rendering area of the 3D model to obtain an actual rendering effect of the fan-shaped image in the 3D model.

In a third aspect, the present disclosure provides a terminal. The terminal includes a memory, a processor, and a computer program stored in the memory, where when the computer program is executed by the processor, various steps of the method for adaptively rendering a fan-shaped image to a 3D model according to any of the above embodiments are implemented.

In a fourth aspect, the present disclosure provides a computer-readable storage medium. A computer program is stored in the computer-readable storage medium, and when the computer program is executed by the processor, various steps of the method for adaptively rendering a fan-shaped image to a 3D model according to any of the above embodiments are implemented.

In a fifth aspect, the present disclosure provides a computer program product, and the product includes a computer program or instructions, where when the computer program or the instructions are executed by the processor, various steps of the method for adaptively rendering a fan-shaped image to a 3D model according to any of the above embodiments are implemented.

According to the method, device, terminal and medium for adaptively rendering a fan-shaped image to a 3D model provided by the present disclosure, a vertex to UV point mapping algorithm for the 3D model is executed by traversing triangular facet in a triangle queue, i.e., for each vertex of each triangular facet, a corresponding UV mapping point on the fan-shaped image is located, to obtain UV texture coordinate data of the 3D model mapped onto the fan-shaped image. Therefore, the present disclosure has the following beneficial effects:

(1) only part of the texture image to be rendered needs to be transmitted to a rendering module of 3D modeling software to achieve localized texture mapping, which saves memory during rendering, reduces the number and size of files, and improves a rendering speed and precision; a rendering result almost resembles an actual product, and better adaptation to more flexible atypical designs is achieved;

(2) data reuse is achieved, and same parameters can be used directly for images of a same specification and size as long as an image position offset remains unchanged, without need of recalculation;

(3) existing design assets can be directly utilized, without need for various modifications and conversions required by the above two existing industry solutions mentioned in the background art, thereby saving a heavy workload and achieving zero-cost utilization of existing assets; and (4) the actual state of any product in the production process can be fully simulated, which constitutes a foundation and premise for digital twin realization in industries of paper cups and the like.

BRIEF DESCRIPTION OF THE DRAWINGS

To describe the technical solution in the examples of the present disclosure more clearly, the accompanying drawings required for describing the examples are briefly described below. It should be understood that the following accompanying drawings show merely some examples of the present disclosure, and therefore it should not be construed as a limitation to the scope. Those of ordinary skill in the art can also derive other accompanying drawings from these accompanying drawings without making inventive efforts.

FIG. 2 is a flowchart of S60 in the method for adaptively rendering a fan-shaped image to a 3D model shown in FIG. 1.

FIG. 3 is a flowchart of S69 shown in FIG. 2.

DETAILED DESCRIPTIONS OF THE EMBODIMENTS

Figure 1:
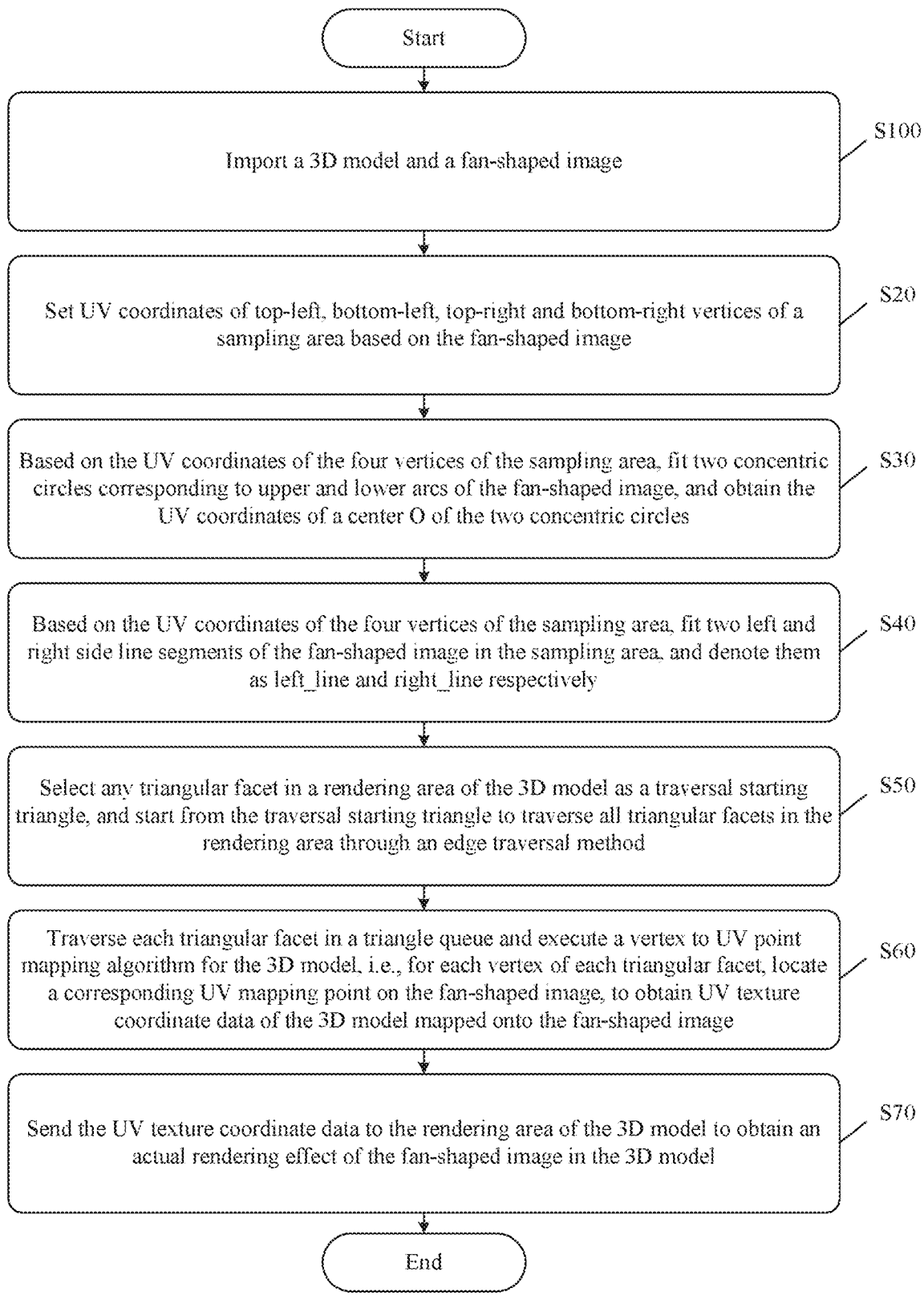
FIG. 1 is a flowchart of a method for adaptively rendering a fan-shaped image to a 3D model provided by the present disclosure.

To make objectives, technical solutions and beneficial technical effects of the present disclosure clearer, the present disclosure will be further described in detail with reference to accompanying drawings and specific embodiments. It should be understood that the specific embodiments described in the present specification are merely illustrative of the present disclosure and are not intended to limit the present disclosure.

It should also be understood that the terms used in the present specification are merely for describing specific examples and are not intended to limit the present disclosure. As used in the present specification and the appended claims, the singular terms "a", "an" and "the" are intended to include the plural forms unless clearly indicated otherwise in the context.

It should be further understood that the term "and/or" as used in the present specification and the appended claims refers to and includes any or all possible combinations of one or more of the associated listed items.

Example 1

In an example of the present disclosure, a method for adaptively rendering a fan-shaped image to a 3D model is provided, and the method is used to render a graphic design to be printed onto a 3D model for a conical object such as a paper cup, to visualize a design effect more intuitively and identify potential defects in the design before the paper cup is produced.

It should be noted that the technical terms that may be involved in this technical solution will be explained below first.

A rectangular coordinate system of a three-dimensional cone: refers to a spatial rectangular coordinate system where an origin O is inside the cone, an x-axis points to right, a y-axis is perpendicular to a cone surface, and a z-axis points to an observer.

A polar coordinate system of a circular section: refers to a polar coordinate system established based on angle and radius parameters, where the circular section is perpendicular to a center line of the cone, a center of a circle as the origin O, and a specific point on the circle is selected as a starting point.

A polar coordinate system of a fan-shaped image: refers to a polar coordinate system established based on angle and length parameters, where an intersection point between two sides of a fan-shaped image is the origin O, and a straight line where either of the two sides is located is a starting line.

A UV coordinate system: refers to a plane on which all image files are two-dimensional, where U represents a horizontal direction, V represents a vertical direction (alternatively, V represents the horizontal direction and U represents the vertical direction), and any pixel point on an image can be positioned through the planar UV coordinate system. This coordinate system defines positional information of each pixel point on the image, and these points are interrelated to the 3D model to determine a surface texture of the 3D model.

A seam line: refers to a line that connects the two sides of the fan-shaped image in an overlapped manner, such as a line of bonding walls of a paper cup.

A state of paper cup: refers to a final form of a paper cup product. Due to the influence of design, typesetting, printing, die-cutting, molding and other processes, a paper cup may have various product defects despite of a qualified state, such as misalignment of both sides of a color stripe, white leakage, crooked cutting, and the like.

Texture mapping: also known as texture pasting, is a process of pasting a planar image onto a surface of a three-dimensional object.

Coordinate conversion: is a process of converting from one coordinate space to another coordinate space, for example, a vertex of a 3D model space can be mapped to a point on the UV coordinate system through a series of coordinate conversion.

A model space: is a rectangular space coordinate system where a central axis of the 3D model of the paper cup serves as the y-axis, an origin is located on the y-axis, and different choices of x, y, and z-axes are selected for different model design software, but an algorithm is not affected.

A rendering area: is an area of the paper cup that needs to be printed, that is, a rendering area corresponding to the 3D model of the paper cup, generally referring to a conical surface at a specified height corresponding to the central axis.

A sampling area: refers to an area formed by all UV coordinate points mapped on a texture map corresponding to all vertices in the rendering area.

A triangular facet: refers to a triangle, and a 3D model or mesh will be triangulated. Rendering of the 3D model is based on the triangular facets.

Edge traversal: refers to a process of traversing an entire surface of a specified area by determining whether a triangular facet on a surface of the 3D model provided is adjacent to another triangular facet by checking whether the another triangular facet is collinear with an edge of the triangular facet.

A central axis: refers to an axis that passes through a center O of the cone and is perpendicular to the circular section in the 3D model of the paper cup.

As illustrated in FIG. 1, the method for adaptively rendering a fan-shaped image to a 3D model includes steps S10-S70:

S10: a 3D model and a fan-shaped image are imported;

S20: UV coordinates of top-left, bottom-left, top-right and bottom-right vertices of a sampling area are set based on the fan-shaped image;

S30: based on the UV coordinates of the four vertices of the sampling area, two concentric circles corresponding to upper and lower arcs of the fan-shaped image are fitted, and the UV coordinates of a center O of the two concentric circles are obtained;

S40: based on the UV coordinates of the four vertices of the sampling area, two left and right side line segments of the fan-shaped image in the sampling area are fitted, and denoted as left_line and right_line respectively;

S50: any triangular facet in a rendering area of the 3D model is selected as a traversal starting triangle, and starting from the traversal starting triangle, all triangular facets in the rendering area are traversed through an edge traversal method;

The edge traversal method is also directly given when 3D modeling. Further, the S50 includes: all triangular facets in the rendering area are further filtered.

S60: triangular facet in a triangle queue are traversed, and a vertex to UV point mapping algorithm for the 3D model is executed, i.e., for each vertex $V(x_i, y_i, z_i)$ of triangular facet, a corresponding UV mapping point $V'(x_i', y_i', z_i')$ on the fan-shaped image is located, to obtain UV texture coordinate data of the 3D model mapped onto the fan-shaped image; and S70: the UV texture coordinate data is sent to the rendering area of the 3D model to obtain an actual rendering effect of the fan-shaped image in the 3D model.

Further, as illustrated in FIG. 2, the S60 includes sub-steps S61-S69:

S61: upper and lower edges of the rendering area of the 3D model are determined to calculate a height of the rendering area; upper and lower intersection points where the upper and lower edges intersect with a seam line are located, where the two intersection points are respectively named as an upper starting point of rendering and a lower starting point of rendering;

S62: any rendering starting point is selected to determine a side length of the left_line, i.e., a height of the sampling area; coordinates $S(x_0, y_0, z_0)$ of a rendering starting point S in a rectangular coordinate system of a three-dimensional cone are defined;

S63: a height scaling ratio k between the rendering area and the sampling area is calculated, where k=the height of the sampling area/the height of the rendering area;

S64: a circular section perpendicular to a central axis of the 3D model is created through the upper starting point S, and intersects the central axis at a point O' to obtain a vector O'S;

S65: a circular section perpendicular to the central axis of the 3D model is created through the vertex $V(x_i, y_i, z_i)$, and intersects the central axis at a point O" to obtain a vector O"V;

S66: the vector O'S is rotated to be parallel to the point O"V to obtain a vector O'S', where a point S' is a point on an outer surface of the 3D model;

S67: based on a cross product of the two spatial vectors, an angle θ at which the vector O'S rotates to the vector O'S' is calculated;

S68: based on the calculated angle θ, spatial coordinates S' (x', y', z') of the point S' are calculated, and then a spatial length d from the point S' to the vertex $V(x_i, y_i, z_i)$ is calculated; and S69: based on the height scaling ratio k and the spatial length d, the UV mapping point V' of the vertex V on the fan-shaped image is calculated.

Further, as illustrated in FIG. 3, the S69 includes sub-steps S691-S695.

S691: a corresponding position of a vertex on the side line segment left_line of the sampling area is recorded as a point P1 after shrinking by a length d*k along the side line segment left_line, a straight line line1 connecting the point P1 and the center O is drawn, and a distance R from the point P1 to the center O is calculated;

S692: an intersection point P2 where a circle with the center O and a radius R intersects with the side line segment right_line is located, and a straight line line2 connecting the point P2 and the center O is drawn;

S693: an angle θ' between the line1 and the line2 is calculated;

S694: a rotation angle $\theta''=(\theta'/(2\pi))*\theta$ is calculated according to the angles θ and θ'; and S695: a UV coordinate translation and rotation matrix A(θ") is applied to the point P1 to obtain the UV mapping point V' of the vertex V on the fan-shaped image, where A(θ") represents a rotation matrix that rotates the point P1 by the angle θ".

Therefore, the core of the technical solution of the present disclosure lies in calculating the corresponding (k*d, θ") according to model space coordinates and achieving the conversion of coordinate spaces: localized UV mapping is achieved on the basis of conversion from rectangular coordinates of a three-dimensional cone (coordinates of the 3D model) to polar coordinates of a circular section, polar coordinates of a circular section, polar coordinates of a fan-shaped image, and UV coordinates sequentially.

Figure 4:
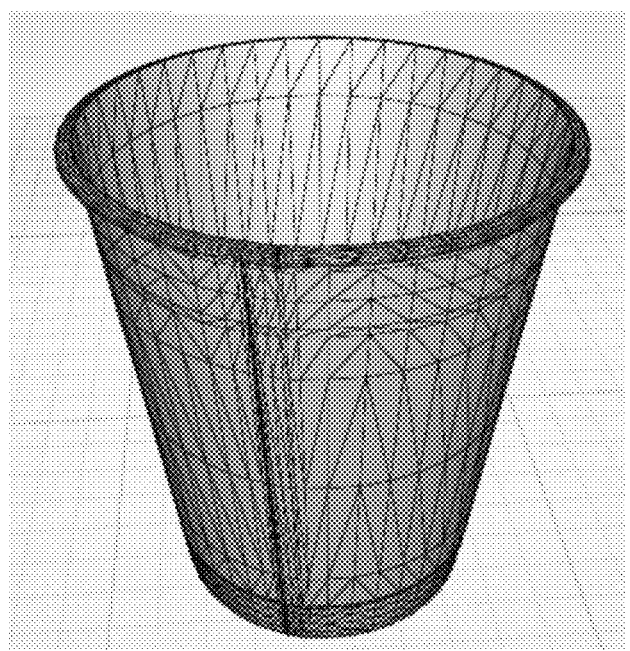
FIG. 4 is an actual rendering graph of mapping a texture of a fan-shaped image to a surface of a 3D paper cup model according to an exemplary example.

As illustrated in FIG. 4 (one exemplary example), an actual rendering graph of mapping a texture of a fan-shaped image to a surface of a 3D paper cup model is presented.

Example 2

The present disclosure provides a device 100 for adaptively rendering a fan-shaped image to a 3D model, and the device is used to render a graphic design to be printed onto a 3D model for a conical object such as a paper cup, to visualize a design effect more intuitively and identify potential defects in the design before the paper cup is produced. It should be noted that the implementation principles and specific embodiments of the device 100 for adaptively rendering a fan-shaped image to a 3D model are consistent with the above method for adaptively rendering a fan-shaped image to a 3D model, and therefore will not be repeated below.

Figure 5:
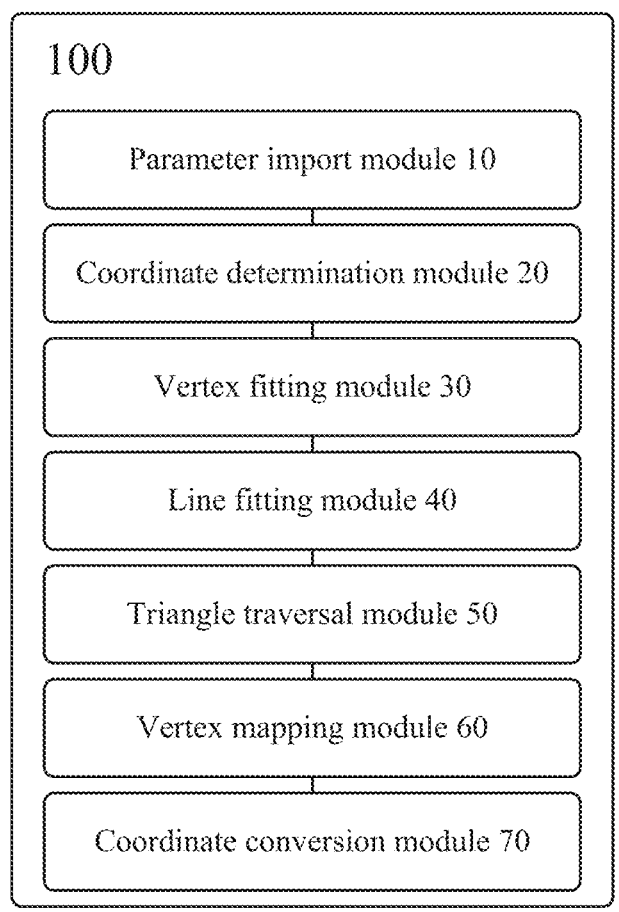
FIG. 5 is a framework diagram of a device for adaptively rendering a fan-shaped image to a 3D model provided by the present disclosure.

As illustrated in FIG. 5, the device 100 for adaptively rendering a fan-shaped image to a 3D model includes:

a parameter import module 10, configured for importing a 3D model and a fan-shaped image;

a coordinate determination module 20, configured for setting UV coordinates of top-left, bottom-left, top-right and bottom-right vertices of a sampling area based on the fan-shaped image;

a vertex fitting module 30, configured for fitting two concentric circles corresponding to upper and lower arcs of the fan-shaped image based on the UV coordinates of the four vertices of the sampling area, and obtaining the UV coordinates of a center O of the two concentric circles;

a line fitting module 40, configured for fitting two left and right side line segments of the fan-shaped image in the sampling area based on the UV coordinates of the four vertices of the sampling area, and denoting them as left_line and right_line respectively;

a triangle traversal module 50, configured for selecting any triangular facet in a rendering area of the 3D model as a traversal starting triangle, and starting from the traversal starting triangle to traverse all triangular facets in the rendering area through an edge traversal method;

a vertex mapping module 60, configured for traversing triangular facet in a triangle queue and executing a vertex to UV point mapping algorithm for the 3D model, i.e., for each vertex $V(x_i, y_i, z_i)$ of triangular facet, locating a corresponding UV mapping point $V'(x_i', y_i', z_i')$ on the fan-shaped image, to obtain UV texture coordinate data of the 3D model mapped onto the fan-shaped image; and a coordinate conversion module 70, configured for sending the UV texture coordinate data to the rendering area of the 3D model to obtain an actual rendering effect of the fan-shaped image in the 3D model.

It should be noted that the vertex mapping module 60 is also capable of implementing corresponding functions according to the contents described in the steps S61-S69 and the steps S691-S695 in Example 1 embodiment, which will not be repeated herein.

Example 3

The present disclosure provides a terminal. The terminal includes a memory, a processor, and a computer program stored in the memory, where when the computer program is executed by the processor, various steps of the method for adaptively rendering a fan-shaped image to a 3D model according to any of the above embodiments are implemented.

Example 4

The present disclosure provides a computer-readable storage medium. A computer program is stored in the computer-readable storage medium, and when the computer program is executed by the processor, various steps of the method for adaptively rendering a fan-shaped image to a 3D model according to any of the above embodiments are implemented.

Example 5

The present disclosure provides a computer program product, and the product includes a computer program or instructions, where when the computer program or the instructions are executed by the processor, various steps of the method for adaptively rendering a fan-shaped image to a 3D model according to any of the above embodiments are implemented.

To sum up, according to the method, device, terminal and medium for adaptively rendering a fan-shaped image to a 3D model provided by the present disclosure, a vertex to UV point mapping algorithm for the 3D model is executed by traversing triangular facet in a triangle queue, i.e., for each vertex of each triangular facet, a corresponding UV mapping point on the fan-shaped image is located, to obtain UV texture coordinate data of the 3D model mapped onto the fan-shaped image. Therefore, the present disclosure has the following beneficial effects:

(1) only part of the texture image to be rendered needs to be transmitted to a rendering module of 3D modeling software to achieve localized texture mapping, which saves memory during rendering, reduces the number and size of files, and improves a rendering speed and precision; a rendering result almost resembles an actual product, and better adaptation to more flexible atypical designs is achieved;

(2) data reuse is achieved, and same parameters can be used directly for images of a same specification and size as long as an image position offset remains unchanged, without need of recalculation;

(3) existing design assets can be directly utilized, without need for various modifications and conversions required by the above two existing industry solutions mentioned in the background art, thereby saving a heavy workload and achieving zero-cost utilization of existing assets; and (4) the actual state of any product in the production process can be fully simulated, which constitutes a foundation and premise for digital twin realization in industries of paper cups and the like.

Those skilled in the art can clearly understand that for the convenience and brevity of the description, only the division of the above functional units and modules is used for illustration. In practical applications, the above functions can be assigned to different functional units and modules according to needs, that is, the internal structure of the system is divided into different functional units or modules to complete all or part of the functions described above. All functional units and modules in each of the examples of the present disclosure may be integrated into one processing unit, or may be independently and physically present, or two or more units may be integrated into one unit. The above integrated units may be implemented in the form of hardware, or may be implemented in the form of a software functional unit. Furthermore, specific names of all functional units and modules are merely or the convenience of distinguishing each other and are not intended to limit the scope of protection of the present disclosure. For the specific working process of the units and modules in the above system, reference may be made to the corresponding process in the foregoing method embodiments, and details are not described herein again.

In the above examples, each example is described with its own emphasis. For parts that are not described in detail or recorded in a certain example, please refer to the relevant descriptions of other examples.

Those of ordinary skill in the art may appreciate that the units and method steps described in combination with the examples disclosed herein can be implemented through electronic hardware, or a combination of computer software and electronic hardware. Whether these functions are performed in electronic hardware or software depends on the specific application and design constraints of the technical solution. Those skilled in the art can use different methods to implement the described functions for each particular application, but such implementation should not be considered to be beyond the scope of the present disclosure.

In the examples provided by the present disclosure, it should be understood that the disclosed system or device/terminal and method may be implemented in other ways. For example, the examples of the system or device/terminal described above are merely illustrative. For example, division of the modules or units is merely a kind of division of logic functions, there may be other division modes in actual implementation, and for example, a plurality of units or assemblies may be combined or integrated into another system, or some features may be omitted or not executed. Furthermore, shown or discussed coupling or direct coupling or communication connection between each other may be an indirect coupling or communication connection by means of some interfaces, systems or units, and may be in an electrical, mechanical or other form.

The unit described as a separable component may be physically separated or not, and a component shown as a unit may be a physical unit or not, that is, may be located at one place or may also be distributed on a plurality of network units. Part or all of the units may be selected according to actual needs to achieve the objective of the solution of the examples of the present disclosure.

In addition, all functional units in each of the examples of the present disclosure may be integrated into one processing unit, or may be independently and physically present, or two or more units may be integrated into one unit. The above integrated units may be implemented in the form of hardware, or may be implemented in the form of a software functional unit.

The present disclosure is not limited merely to what is described in the specification and the embodiments, such that additional advantages and modifications can be readily achieved by those skilled in the art. Without departing from the spirit and scope of the general concept as defined by the claims and the equivalents, the present disclosure is not limited to the specific details, representative apparatus, and illustrative examples as shown and described herein.

What is claimed is:

1. A method for adaptively rendering a fan-shaped image to a 3D model, comprising the following steps:

S10: importing a 3D model and a fan-shaped image;

S20: setting UV coordinates of top-left, bottom-left, top-right and bottom-right vertices of a sampling area based on the fan-shaped image;

S30: based on the UV coordinates of the four vertices of the sampling area, fitting two concentric circles corresponding to upper and lower arcs of the fan-shaped image, and obtaining the UV coordinates of a center O of the two concentric circles;

S40: based on the UV coordinates of the four vertices of the sampling area, fitting two left and right side line segments of the fan-shaped image in the sampling area, and denoting them as left_line and right_line respectively;

S50: selecting any triangular facet in a rendering area of the 3D model as a traversal starting triangle, and starting from the traversal starting triangle to traverse all triangular facets in the rendering area through an edge traversal method;

S60: traversing triangular facet in a triangle queue and executing a vertex to UV point mapping algorithm for the 3D model, i.e., for each vertex $V(x_i,y_i,z_i)$ of triangular facet, locating a corresponding UV mapping point $V'(x_i',y_i',z_i')$ on the fan-shaped image, to obtain UV texture coordinate data of the 3D model mapped onto the fan-shaped image; and S70: sending the UV texture coordinate data to the rendering area of the 3D model to obtain an actual rendering effect of the fan-shaped image in the 3D model;

the S60 comprises:

S61: determining upper and lower edges of the rendering area of the 3D model to calculate a height of the rendering area; locating upper and lower intersection points where the upper and lower edges intersect with a seam line, wherein the two intersection points are respectively named as an upper starting point of rendering and a lower starting point of rendering;

S62: selecting any rendering starting point to determine a side length of the left_line, i.e., a height of the sampling area; defining coordinates $S(x_0,y_0,z_0)$ of a rendering starting point S in a rectangular coordinate system of a three-dimensional cone;

S63: calculating a height scaling ratio k between the rendering area and the sampling area, wherein k=the height of the sampling area/the height of the rendering area;

S64: creating a circular section perpendicular to a central axis of the 3D model through the upper starting point S, and intersecting the central axis at a point O' to obtain a vector O'S;

S65: creating a circular section perpendicular to the central axis of the 3D model through the vertex $V(x_i, y_i, z_i)$, and intersecting the central axis at a point O" to obtain a vector O"V;

S66: rotating the vector O'S to be parallel to the point O"V to obtain a vector O'S', wherein a point S' is a point on an outer surface of the 3D model;

S67: based on a cross product of the vector O'S and the vector O"V, calculating an angle $\theta$ at which the vector O'S rotates to the vector O'S';

S68: based on the calculated angle $\theta$, calculating spatial coordinates $S'(x', y', z')$ of the point S', and then calculating a spatial length d from the point S' to the vertex $V(x_i, y_i, z_i)$; and S69: based on the height scaling ratio k and the spatial length d, calculating the UV mapping point V' of the vertex V on the fan-shaped image.

2. The method for adaptively rendering a fan-shaped image to a 3D model according to claim 1, wherein the S69 comprises the following sub-steps:

S691: recording a corresponding position of a vertex on the side line segment left_line of the sampling area as a point P1 after shrinking by a length d*k along the side line segment left_line, drawing a straight line line1 connecting the point P1 and the center O, and calculating a distance R from the point P1 to the center O;

S692: locating an intersection point P2 where a circle with the center O and a radius R intersects with the side line segment right_line, and drawing a straight line line2 connecting the point P2 and the center O;

S693: calculating an angle $\theta'$ between the line1 and the line2;

S694: calculating a rotation angle $\theta''=(\theta'/(2\pi))*\theta$ according to the angles $\theta$ and $\theta'$; and S695: applying a UV coordinate translation and rotation matrix $A(\theta'')$ to the point P1 to obtain the UV mapping point V' of the vertex V on the fan-shaped image, wherein the $A(\theta'')$ represents a rotation matrix that rotates the point P1 by the angle $\theta''$.

3. The method for adaptively rendering a fan-shaped image to a 3D model according to claim 1, wherein the S50 comprises the following sub-step:
filtering all triangular facets in the rendering area.

4. A terminal, comprising a memory, a processor, and a computer program stored in the memory, wherein when the computer program is executed by the processor, various steps of the method for adaptively rendering a fan-shaped image to a 3D model according to claim 1 are implemented.

5. A non-transitory computer-readable storage medium, wherein a computer program is stored in the computer-readable storage medium, and when the computer program is executed by the processor, various steps of the method for adaptively rendering a fan-shaped image to a 3D model according to claim 1 are implemented.

6. A device for adaptively rendering a fan-shaped image to a 3D model, comprising:
a parameter import module, being configured for importing a 3D model and a fan-shaped image;
a coordinate determination module, being configured for setting UV coordinates of top-left, bottom-left, top-right and bottom-right vertices of a sampling area based on the fan-shaped image;
a vertex fitting module, being configured for fitting two concentric circles corresponding to upper and lower arcs of the fan-shaped image based on the UV coordinates of the four vertices of the sampling area, and obtaining the UV coordinates of a center O of the two concentric circles;
a line fitting module, being configured for fitting two left and right side line segments of the fan-shaped image in the sampling area based on the UV coordinates of the four vertices of the sampling area, and denoting them as left_line and right_line respectively;
a triangle traversal module, being configured for selecting any triangular facet in a rendering area of the 3D model as a traversal starting triangle, and starting from the traversal starting triangle to traverse all triangular facets in the rendering area through an edge traversal method;
a vertex mapping module, being configured for traversing triangular facet in a triangle queue and executing a vertex to UV point mapping algorithm for the 3D model, i.e., for each vertex $V(x_i,y_i,z_i)$ of triangular facet, locating a corresponding UV mapping point $V'(x_i',y_i',z_i')$ on the fan-shaped image, to obtain UV texture coordinate data of the 3D model mapped onto the fan-shaped image; and
a coordinate conversion module, being configured for sending the UV texture coordinate data to the rendering area of the 3D model to obtain an actual rendering effect of the fan-shaped image in the 3D model;
an application process of the vertex mapping module comprises the following steps:
S61: determining upper and lower edges of the rendering area of the 3D model to calculate a height of the rendering area; locating upper and lower intersection points where the upper and lower edges intersect with a seam line, wherein the two intersection points are respectively named as an upper starting point of rendering and a lower starting point of rendering;
S62: selecting any rendering starting point to determine a side length of the left_line, i.e., a height of the sampling area; defining coordinates S $(x_0,y_0,z_0)$ of a rendering starting point S in a rectangular coordinate system of a three-dimensional cone;
S63: calculating a height scaling ratio k between the rendering area and the sampling area, wherein k=the height of the sampling area/the height of the rendering area;
S64: creating a circular section perpendicular to a central axis of the 3D model through the upper starting point S, and intersecting the central axis at a point O' to obtain a vector O'S;
S65: creating a circular section perpendicular to the central axis of the 3D model through the vertex $V(x_i, y_i, z_i)$, and intersecting the central axis at a point O" to obtain a vector O"V;
S66: rotating the vector O'S to be parallel to the point O"V to obtain a vector O'S', wherein a point S' is a point on an outer surface of the 3D model;
S67: based on a cross product of the vector O'S and the vector O"V, calculating an angle $\theta$ at which the vector O'S rotates to the vector O'S';
S68: based on the calculated angle $\theta$, calculating spatial coordinates S' (x', y', z') of the point S', and then calculating a spatial length d from the point S' to the vertex $V(x_i, y_i, z_i)$; and
S69: based on the height scaling ratio k and the spatial length d, calculating the UV mapping point V' of the vertex V on the fan-shaped image.

* * * * *